Figure 4:
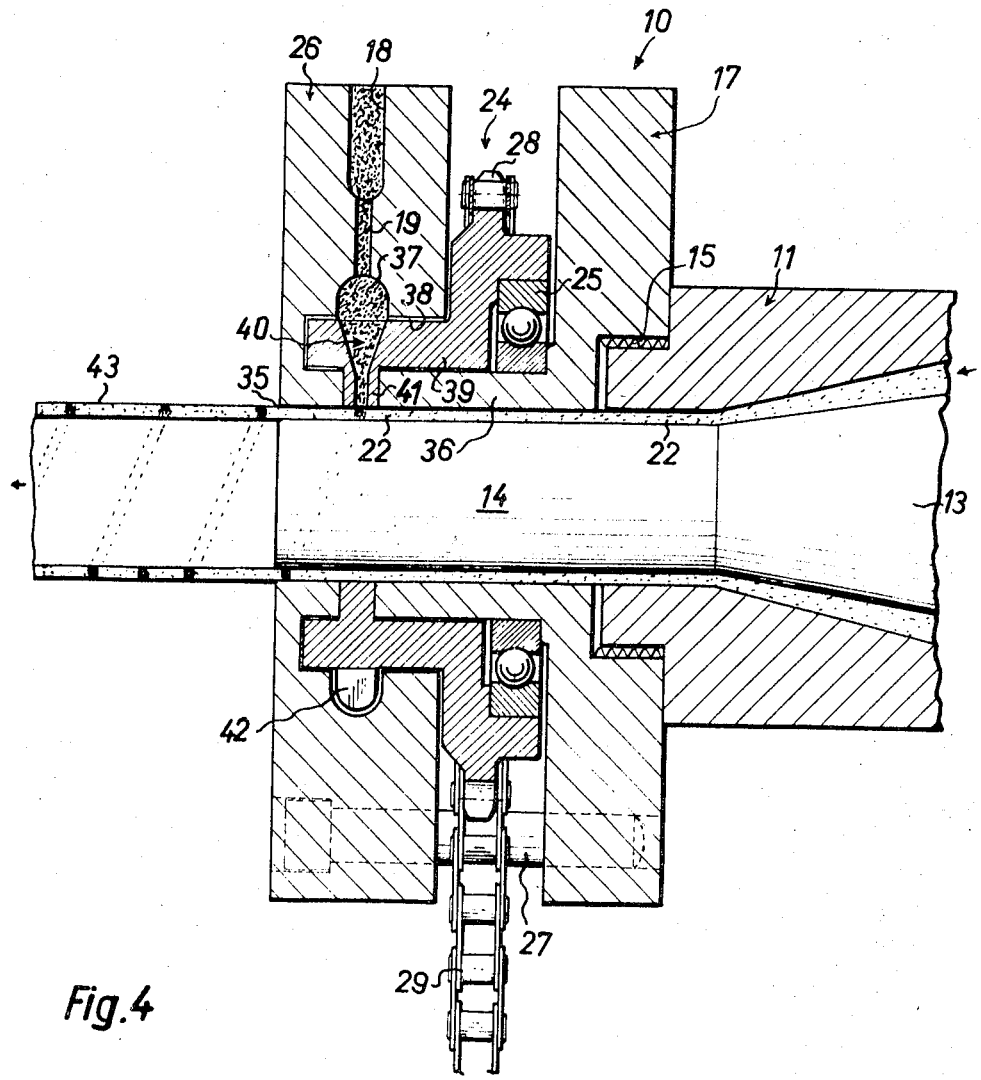

United States Patent
Meneidis

[15] 3,642,396
[45] Feb. 15, 1972

[54] EXTRUSION HEAD FOR CONTINUOUSLY EXTRUDING A COMPOUND STRAND OF PLASTIC MATERIALS

[72] Inventor: Petros G. Meneidis, Aharnae, Greece
[73] Assignee: Lavreotiki Societe Industrielle Anonyme, Athens, Greece
[22] Filed: Feb. 4, 1969
[21] Appl. No.: 796,509

[30] Foreign Application Priority Data
Feb. 14, 1968 Greece .................................34082/68
Aug. 21, 1968 Greece .................................35413/68

[52] U.S. Cl..............................425/109, 264/173, 264/209, 425/131, 425/381, 425/382
[51] Int. Cl......................B29f 3/01, B29f 3/12, B32b 31/30
[58] Field of Search..................264/171, 173, 209; 18/13 RR, 18/14 RR; 156/244

[56] References Cited
UNITED STATES PATENTS
2,191,829  2/1940  Johnson....................18/13 R
2,800,683  7/1957  Teichman..................156/244 X
3,308,220  3/1967  Smith........................156/244 X FOREIGN PATENTS OR APPLICATIONS
40/21432  9/1965  Japan........................264/176

Primary Examiner—Robert F. White
Assistant Examiner—J. H. Silbaugh
Attorney—Littlepage, Quaintance, Wray & Aisenberg

[57] ABSTRACT

Apparatus for manufacturing a strongly integrated compound strand formed by pressing together at least two different plastic materials. A first extruded plastic strand is pressed through a hollow cylindrical die and a second extruded plastic strand is pressed through a generally radial passageway into an annular portion. A rotary part rotated about the axis of the cylindrical die includes a portion of the passageway for helically winding the second plastic strand into the first plastic strand.

4 Claims, 5 Drawing Figures

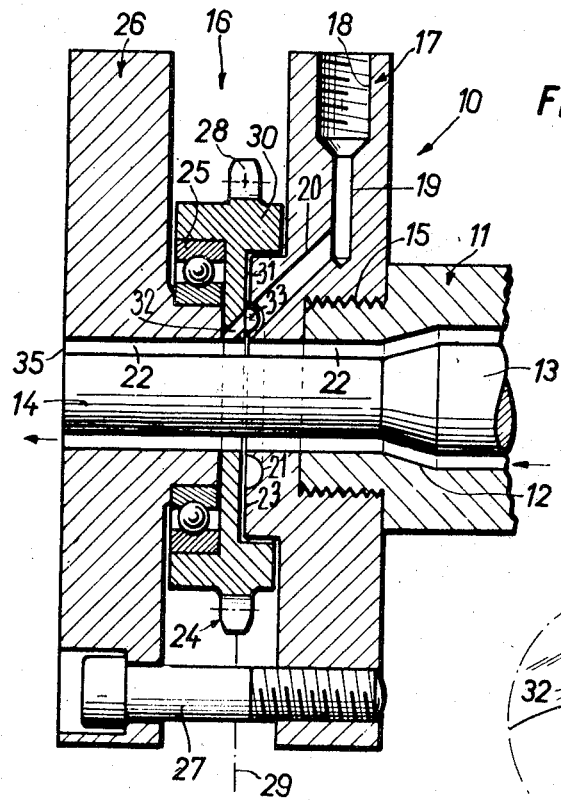
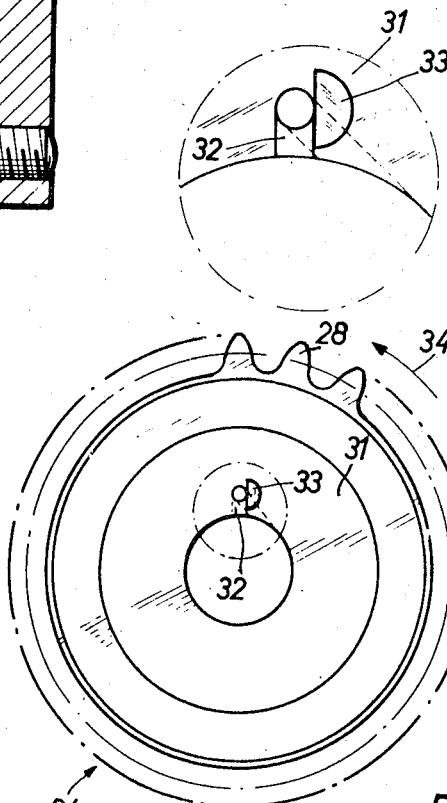
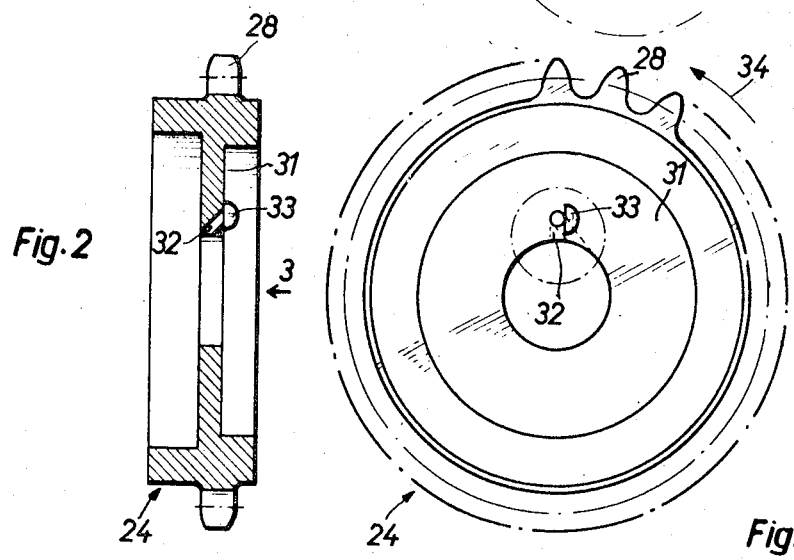

EXTRUSION HEAD FOR CONTINUOUSLY EXTRUDING A COMPOUND STRAND OF PLASTIC MATERIALS

The present invention relates to apparatus for manufacturing a strongly integrated compound strand article formed of at least two different plastic materials.

Compound strands formed of several polymer materials have been manufactured by individually pressing and gauging a number of strands which are brought together and joined to each other by gluing or welding. Such methods have inter alia the disadvantage that they require a great number of steps. Further, frequently the resulting extrusion pressed strand article does not form into a homogeneous strand.

Moreover, it was for the most part not possible to strengthen such pressed strand articles with a polymer material. It was possible only to strengthen such strands by textile or metallic weaves, individual threads, cords or nets, embodied in a first polymer strand to be subsequently pressed with a second polymer strand. Apart from the fact that strengthened strand articles manufactured in this way are less homogeneous, such a method is complicated in the handling and joining of two materials which are fundamentally different in their properties, i.e., requires numerous steps to unite such materials. This is particularly true in the manufacture of strengthened or reinforced extrusion pressed hollow bodies, for example, pipes or flexible hoses.

The invention provides apparatus for carrying out a method which is simple and which requires a minimum of maintenance and which permits great speed of manufacture and which produces a compound strand substantially free from the above-mentioned disadvantages.

The invention consists in apparatus for manufacturing a compound strand of at least two extrudable plastic materials by a method comprising: extruding a first plastic strand, extruding a second plastic strand, and helically winding the second plastic strand about and into engagement with the first plastic strand while both strands are being extruded and are in a plastic fluid state.

The invention further consists in an injection head for forming a compound strand of at least two extrudable plastic materials comprising: a body having a channel for feeding a first plastic strand and a passageway for feeding a second plastic strand into the said channel, a rotary part arranged for rotation about the channel and including the portion of the said passageway adjacent to the channel, whereby upon rotating the rotary part the second strand is helically wound and pressed on to the first strand.

Preferably, the said passageway includes an annular portion and the rotary part includes a vane having a profile corresponding to the cross section of the said annular portion, so that upon rotation of the rotary part the vane pushes the second strand through the said annular portion into the portion of the passageway in the rotary part.

Preferably, the rotary part is disposed between two stationary parts and rotatably mounted on one of the parts.

The invention further consists in apparatus for forming a compound strand wherein the first plastic strand has at least one physical characteristic different from the second plastic strand.

Preferably, the first plastic strand has greater flexibility than the second plastic strand and the second plastic strand has greater strength than the first plastic strand.

The above-mentioned physical characteristic may be the color, the mechanical resistance or both.

The helical shape of the second strand helps retain the properties of flexibility in the finished compound strand, so that the second strand gives the finished hollow compound strand a particularly high-shape stability and strength to resist excessive internal pressures.

On the other hand, the differing physical characteristic property of the two strands may be only the color. The compound strand may be pressed about an electric conductor to form insulation therefor. In such a case, a plurality of different dies, for example, four dies, various color combinations may be produced.

The invention will now be described with reference to the accompanying drawings, wherein:

FIG. 1 is a diagrammatic longitudinal section of a first embodiment of an injection head, FIG. 2 is a detail in longitudinal section of a component part of the injection head shown in FIG. 1, FIG. 3 is an end view of the component part shown in FIG. 2, seen in direction of the arrow 3 in FIG. 2, FIG. 3A shows an enlarged portion of the component of FIG. 3, and FIG. 4 is a diagrammatic longitudinal section of a second embodiment of the injection head.

The injection head 10 shown in FIGS. 1–3 may be arranged as a longitudinal or transverse injection head, and forms the end of a conventional injection or extrusion press, i.e., a worm press, which is hereinafter called the "first extruder." In FIG. 1, the first extruder is disposed to the right of the injection head 10, as illustrated in FIG. 1. Accordingly, the flow of material from the first extruder is from the right to the left as indicated by the arrow in FIG. 1.

The end portion 11 of the first extruder has a conically tapered bore 12 for receiving a torpedo 13, which is integral with an injection mandrel 14 arranged in the injection head 10. The end portion 11 includes an external screw thread 15 which is received in the die body, generally indicated as 16, by a cooperating screw thread. The die body 16 includes the first of the component parts, a plate 17, which threadedly engages the screw thread 15 and is therefore fixed relative to the first extruder.

The plate 17 has a radial bore 18, with integral screw-threading for connection with a second injection press, hereinafter called the "second extruder" (not shown). The base of the bore 18 communicates with passageway 19 directed inwards which communicates with an inclined passageway 20, which in turn is in communication with an annular groove 21 formed in the front face of the plate 17 and arranged concentrically with respect to the injection mandrel 14. Accordingly, a strand of plastics material from the second extruder pressed into the plate 17 will pass through the threaded bore 18, the passageways 19 and 20 and onto the annular groove 21.

The annular groove is formed in the front face 23 of the plate 17 remote from the end of the first extruder and is arranged in the vicinity of the die channel 22 which passes through the entire die body 16.

Although the Figures of the drawings appear to show play between part 24 and the plate 17, the part 24 and plate 17 abuts closely along face 23, as can be seen in FIGS. 2 and 3, and is connected for rotation therewith. The part 24, as described in detail below, is connected for rotation by a ball bearing 25 disposed on a second plate 26, which is fixedly connected to the plate 17 by several bolts 27 (only one of which is shown). The rotary part 24 is disposed between the stationary plates 17 and 26. The main component parts 17, 24 and 26 of the die body have an internal bore which is coaxially spaced from the injection mandrel 14 forming a hollow cylindrical gap 22 or die channel therebetween.

The periphery of the rotary part 24 is formed as a toothed gear 28 which is arranged to mesh with a driven chain 29 which is shown diagrammatically in FIG. 1. The thickened hub 30 of the rotary part 24 receives on one side the ball bearing 25, and on the other side a depression 31 engages, with as little play as possible, end face or fitting surface 23 of the plate 17. The rotary part 24 includes an inclined bore 32 which communicates with the annular channel or groove 21 at one end and the die channel 22 at the other end. As can be seen from FIG. 3, the inclined bore 32 may run either in the same direction as the passageway 20 in the plate 17, as drawn in full lines; or it may run tangentially to the die channel 22, as shown in dotted lines. A vane 33 is disposed in the immediate vicinity of the end of the bore 32, communicating with the annular channel 21, and formed on the rotary part 24, although as shown in the drawing, the vane 33 fits as closely as possible to the inner profile of the annular channel 21. Accordingly, when the rotary part 24 rotates, the vane 33 slides along the annular channel 21.

The operation of the injection head 10 shown in FIG. 1 is as follows: the first extruder (not shown) feeds a plastic material into the die channel 22 and, at the same time, the second extruder feeds a second plastic material into the bore 18 and then through passageways 19, 20, annular groove 21 and bore 32. The direction of advance of the first extruder is designated as "axial," and that of the second extruder as "radial."

By rotating the rotary part 24 by the chain 29 anticlockwise, i.e., in the direction of the arrow 34, the bore 31 rotates about the injection mandrel 14. Accordingly the outlet orifice of the bore 32 rotates relative to the die channel 22 as the bore 18 rotates relative to the injection mandrel 14.

Accordingly, the second strand is pressed radially into the axially flowing main strand, from a rotating position about the first strand. This in turn gives the second strand a helical shape, by the super imposition of the radial flow into the axial direction.

The two plastic strands are then pressed together by the following material through the part of the die channel 22 surrounding the plate 26, and are accordingly gauged or calibrated, i.e., the second strand which is still in a fluid state is embedded in the first strand which is also in a fluid state, so that the hollow tubular strand issuing from the end 35 of the die body 16 is homogeneous and uniform. The resulting hollow tubular strand can then be subjected to further operations, either immediately after leaving the die body 16 or at some later time. The resulting hollow tubular strand can accordingly be further used as flexible hose or tube or can be used as semifinished product for producing bottles or cylinders by blow moulding or for pressing around an electric cable.

FIG. 4 will now be described. Note that the same reference numbers as in FIGS. 1 to 3 are used to indicate the similar elements wherever possible. As in the first embodiment the end 11 of the first extruder is secured to the plate 17 by the screw thread 15.

In contrast to the first embodiment, the ball bearing 25 is disposed onto the cylindrical extension 36 of the plate 17. The plate 26 is secured to the plate 17. The bore 18 for receiving plastics material from the second extruder is disposed in the plate 26, and communicates with the passageway 19 which in turn communicates with an annular groove 37 formed in the cylindrical wall 38 in the plate 26. This annular groove 37 serves the same purpose as the annular groove 21 of FIG. 1. The difference is that the groove 37 in the second embodiment does not abut a flat surface against the rotary part 24. The rotary part 24 has a hollow cylindrical extension 39 rotatable relative to cylindrical wall 38 with as little play as possible. A passageway 40 is formed in the extension 39 which communicates with the bore 32. This passageway 40 is funnel-shaped with the wide portion located opposite the annular groove 37. A radial annular projection 41 is connected to the extension 39 and extends between cylindrical extension 36 and the plate 26. The projection 41 has a passageway therein which extends between the funnel-shaped passageway 40 and the die channel 22.

In this embodiment, a vane 42 is constructed on the rotary part 24 and is shaped so that it conforms to the annular groove 37. Upon rotation of the rotary part 24, the vane 42 slides along the annular groove, whereby the material located therein is continuously pushed forward, circulated along the groove 37 and then through the passageway 40. During rotation there is substantially no relative movement which would subject the material to shearing or tangential stress.

As in the first embodiment, the second embodiment includes a plurality of gear teeth 28 disposed along the periphery of the rotary part 24 driven by a chain 29.

The second embodiment shown in FIG. 4 is to a certain extent the reverse of the first embodiment shown in FIGS. 1 to 3, with the further difference that the transition place at which the second strand is forced into the rotary part 24 is along a curved surface, a cylinder while in the second embodiment the transition place is along a planar surface in the first embodiment.

Moreover, the embodiment shown in FIG. 4, reference to the forces occurring in operation, is more advantageous than the embodiment shown in FIG. 1.

The injection head shown in FIG. 4 could also be simplified by omitting the plate 17 and mounting a bearing for the rotary part 24 directly on the end 11 of the first extruder. In this modification, it would in addition be necessary to secure the plate 26 in a stationary position by suitable means.

The operation of the injection head 10 illustrated in FIG. 4 is similar to that of FIGS. 1 to 3. In FIG. 4 the strand issuing from the first extruder has light dotted shading and the second strand issuing from the second extruder has darker dotted shading. The finished or semifinished hollow strand 43 leaving the end 35 of the injection head 10 is clearly illustrated in FIG. 4 showing the helical mark second strand embedded in the light first strand.

I claim:

1. In an extrusion head for continuously extruding a strand consisting of two different plastic materials:
    an extrusion die converging into a cylindrical extrusion orifice for extruding a first plastic material;
    at least one stationary member having an axial cylindrical opening aligned with and coaxial to said cylindrical orifice for receiving therefrom a stream of said first plastic material, said stationary member defining a fitting surface;
    an annular channel formed in said fitting surface of said stationary member coaxially to said cylindrical opening and in outwardly spaced relationship to the axial cylindrical opening in said stationary member, and a feed opening in said stationary member leading into said annular channel for feeding a pressurized second plastic material into said channel;
    a rotatable member mounted for coaxial rotation around said axial cylindrical opening and to snugly fit said fitting surface, a bore within said rotatable member having a cylindrical wall flush with the inside surface of said axial cylindrical opening in said stationary member;
    a passageway in said rotatable member leading inwardly to said cylindrical wall and outwardly to communicate with said annular channel; and a vane member formed on said rotatable member for rotation therewith, said vane member snugly fitting into the inside of said annular channel for continuously diverting upon rotation of said rotatable member said pressurized second plastic material from said annular channel into said passageway and forcing it therefrom into said stream of first plastic material.

2. The extrusion head of claim 1, which has a stationary cylindrical mandrel coaxially disposed within the axial cylindrical opening and extending through the stationary member and through the rotatable member.

3. In an extrusion head for continuously extruding a stream consisting of two different plastic materials:
    an extrusion die having a die passage converging into a cylindrical extrusion orifice for extruding a first plastic material,
    two stationary members having each an axial cylindrical opening aligned with and coaxial to said cylindrical orifice for receiving therefrom a stream of said first plastic material, said two stationary members defining an axial space therebetween,
    an annular channel formed in one of said stationary members, coaxially to its cylindrical opening and in outwardly spaced relationship thereto, and a feed opening in said stationary member leading into said annular channel for feeding a pressurized second plastic material into said channel,
    a rotatable member snugly mounted for rotation in said axial space between said two stationary members, a bore within said rotatable member having a cylindrical wall flush with the inside surfaces of said axial cylindrical openings in said two stationary members, a passageway in said rotatable member leading inwardly through said cylindrical wall and outwardly to communicate with said annular channel and a vane member formed on said rotatable member for rotation therewith, said vane member snugly fitting into the inside of said annular channel for continuously diverting, upon rotation of said rotatable member, said pressurized second plastic material from said annular channel into said passageway and forcing it therefrom into said strand of first plastic material.

4. The extrusion head of claim 3, which has a stationary cylindrical mandrel coaxially disposed within the axial cylindrical opening and extending through the stationary member and through the rotatable member.

* * * * *